United States Patent
Suzuki

(10) Patent No.: US 11,090,642 B2
(45) Date of Patent: Aug. 17, 2021

(54) HONEYCOMB STRUCTURE FOR SUPPORTING CATALYST AND PRODUCTION METHOD THEREFOR

(71) Applicant: NGK INSULATORS, LTD., Nagoya (JP)

(72) Inventor: Tomoyuki Suzuki, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 44 days.

(21) Appl. No.: 16/356,336

(22) Filed: Mar. 18, 2019

(65) Prior Publication Data
US 2019/0299199 A1    Oct. 3, 2019

(30) Foreign Application Priority Data
Mar. 30, 2018    (JP) .............................. JP2018-070001

(51) Int. Cl.
*B01J 35/02*    (2006.01)
*B01J 37/02*    (2006.01)
*B01J 35/04*    (2006.01)
*B01D 53/94*    (2006.01)

(52) U.S. Cl.
CPC ............. *B01J 35/023* (2013.01); *B01J 35/04* (2013.01); *B01J 37/0215* (2013.01); *B01D 53/945* (2013.01); *B01D 2255/9155* (2013.01)

(58) Field of Classification Search
CPC .. B01J 35/023; B01J 35/04; B01D 2255/9155
USPC .............................. 55/523; 422/180; 428/116
See application file for complete search history.

(56) References Cited

U.S. PATENT DOCUMENTS

| | | |
|---|---|---|
| 2004/0001781 A1 | 1/2004 | Kumar et al. |
| 2004/0131512 A1 | 7/2004 | Abe et al. |
| 2005/0159308 A1* | 7/2005 | Bliss ..................... C04B 35/803 502/439 |
| 2017/0209849 A1 | 7/2017 | Leppelt et al. |

FOREIGN PATENT DOCUMENTS

| | | |
|---|---|---|
| DE | 10 2015 224 370 A1 | 6/2017 |
| JP | 2004-169586 A1 | 6/2004 |
| JP | 2005-530614 A1 | 10/2005 |
| JP | 2008018370 A * | 1/2008 |
| JP | 4680437 B2 | 5/2011 |
| KR | 2016112589 A * | 9/2016 |
| WO | 2004/002621 A2 | 1/2004 |

OTHER PUBLICATIONS

German Office Action (with English translation), German Application No. 10 2019 204 495.6, dated Jun. 14, 2021 (7 pages).

* cited by examiner

*Primary Examiner* — Tom P Duong
(74) *Attorney, Agent, or Firm* — Burr & Brown, PLLC

(57) ABSTRACT

A pillar-shaped honeycomb structure for supporting catalyst, including partition walls partitioning a plurality of cells extending from a first end face provided with a fluid inlet to a second end face provided with a fluid outlet, wherein the partition walls include a first region with a high initial water absorption speed and a second region with a lower initial water absorption speed than the first region, and the initial water absorption speed of the second region is 15% or more lower than the initial water absorption speed of the first region.

20 Claims, 9 Drawing Sheets

US 11,090,642 B2

HONEYCOMB STRUCTURE FOR SUPPORTING CATALYST AND PRODUCTION METHOD THEREFOR

TECHNICAL FIELD

The present invention relates to a honeycomb structure for supporting catalyst. Also, the present invention relates to a production method for the honeycomb structure for supporting catalyst.

BACKGROUND ART

Exhaust gas discharged from an internal combustion engine typified by an automobile engine contains pollutants such as soot, nitrogen oxides (NOx), soluble organic fraction (SOF), hydrocarbons (HC), and carbon monoxide (CO). Therefore, conventionally, pillar-shaped honeycomb structures supporting an appropriate catalyst (oxidation catalyst, reduction catalyst, three-way catalyst, or the like) according to the pollutant have been used frequently for exhaust gas systems of internal combustion engines.

Conventionally, in order to comply with increasingly stringent exhaust gas regulations, it has become common practice to install multiple catalyst-supported honeycomb structures in an exhaust gas system. However, there is demand for space-saving of exhaust gas systems, and attention is focused on technology known as zone-coating, which involves coating different regions of a single honeycomb structure with multiple types of catalyst, respectively.

Japanese Patent Laid-Open No. 2004-169586 (Patent Literature 1) discloses a technique for increasing an amount of catalyst coating in central part of a honeycomb structure and decreasing the amount of catalyst coating on an outer periphery by masking the outer periphery of the honeycomb structure.

National Publication of International Patent Application No. 2005-530614 (Patent Literature 2) discloses a technique for zone-coating a honeycomb structure by immersing one end side and another end side of the honeycomb structure in washcoat slurries containing different catalyst components.

CITATION LIST

Patent Literature

Patent Literature 1: Japanese Patent Laid-Open No. 2004-169586

Patent Literature 2: National Publication of International Patent Application No. 2005-530614

SUMMARY OF INVENTION

In this way, although conventionally a region of the honeycomb structure to be brought into contact with catalyst composition slurries has been sectioned by using masking or the like to achieve zone coating, no contrivance is applied to the honeycomb structure itself in coating different parts of the honeycomb structure with different catalyst composition slurries. Therefore, to improve operating efficiency of zone coating, it may be considered desirable to make some contrivance with respect to the honeycomb structure itself in order to make it easy to coat different regions of the honeycomb structure with different catalysts.

In view of the above circumstances, in one embodiment, an object of the present invention is to provide a honeycomb structure for supporting catalyst that makes zone coating easy. Also, in another embodiment, an object of the present invention is to provide a production method for the honeycomb structure for supporting catalyst.

After conducting extensive studies to solve the above problems, the present inventors have found that when a honeycomb structure for supporting catalyst is made partially hydrophobic, catalysts are less prone to adhere to such hydrophobic part. The present invention has been completed based on the above findings and is illustrated by example below.

[1]

A pillar-shaped honeycomb structure for supporting catalyst, comprising partition walls partitioning a plurality of cells extending from a first end face provided with a fluid inlet to a second end face provided with a fluid outlet, wherein the partition walls include a first region with a high initial water absorption speed and a second region with a lower initial water absorption speed than the first region, and the initial water absorption speed of the second region is 15% or more lower than the initial water absorption speed of the first region.

[2]

The honeycomb structure for supporting catalyst according to [1], wherein the partition walls show a distribution of initial water absorption speed in a direction perpendicular to an extension direction of the cells of the honeycomb structure, and has the first region located on an outer peripheral side and the second region located on a side closer to a central axis than the first region.

[3]

The honeycomb structure for supporting catalyst according to [1], wherein the partition walls show a distribution of initial water absorption speed in a direction perpendicular to an extension direction of the cells of the honeycomb structure, and has the second region located on an outer peripheral side and the first region located on a side closer to a central axis than the second region.

[4]

The honeycomb structure for supporting catalyst according to any one of [1] to [3], wherein the partition walls show a distribution of initial water absorption speed in a direction parallel to an extension direction of the cells of the honeycomb structure, and has the second region located on a side of the fluid inlet and the first region located on a side closer to the fluid outlet than the second region.

[5]

The honeycomb structure for supporting catalyst according to any one of [1] to [3], wherein the partition walls show a distribution of initial water absorption speed in a direction parallel to an extension direction of the cells of the honeycomb structure, and has the first region located on a side of the fluid inlet and the second region located on a side closer to the fluid outlet than the first region.

[6]

The honeycomb structure for supporting catalyst according to any one of [1] to [3], wherein the partition walls show a distribution of initial water absorption speed in a direction parallel to an extension direction of the cells of the honeycomb structure, and has a part of the second region located on a side of the fluid inlet, another part of the second region located on a side of the fluid outlet, and the first region located between the two parts of the second region.

[7]

The honeycomb structure for supporting catalyst according to any one of [1] to [6], wherein the initial water absorption speed of the second region is 30% or more lower than the initial water absorption speed of the first region.

[8]

The honeycomb structure for supporting catalyst according to any one of [1] to [7], wherein a difference in the initial water absorption speed between the first region and the second region is decreased by heat treatment at 600° C. or below.

[9]

The honeycomb structure for supporting catalyst according to any one of [1] to [8], wherein a base material of the partition walls is ceramics.

[10]

The honeycomb structure for supporting catalyst according to any one of [1] to [9], wherein the plurality of cells includes a plurality of first cells, of which a first end face is open and a second end face is plugged, and a plurality of second cells, of which a first end face is plugged and a second end face is open; and the first cells and the second cells are placed adjacent to each other alternately via the partition walls.

[11]

The honeycomb structure for supporting catalyst according to any one of [1] to [10], wherein hydrophobic substance adheres to the second region.

[12]

The honeycomb structure for supporting catalyst according to [11], wherein the hydrophobic substance includes one or more types selected from a group consisting of hydrophobic organosilicon compounds and hydrophobic organic compounds.

[13]

The honeycomb structure for supporting catalyst according to [11] or [12], wherein at least part of the hydrophobic substance adhering to the second region evaporates at 600° C. or below.

[14]

A production method for the honeycomb structure for supporting catalyst according to any one of [1] to [13], the production method comprising bringing part of the partition walls of the pillar-shaped honeycomb structure for supporting catalyst into contact with hydrophobic substance, the honeycomb structure for supporting catalyst comprising the partition walls partitioning the plurality of cells extending from the first end face provided with the fluid inlet to the second end face provided with the fluid outlet.

[15]

The production method for the honeycomb structure for supporting catalyst according to [14], the production method comprising bringing part of the partition walls of the pillar-shaped honeycomb structure for supporting catalyst into contact with a fluid containing hydrophobic substance, the honeycomb structure for supporting catalyst comprising the partition walls partitioning the plurality of cells extending from the first end face provided with the fluid inlet to the second end face provided with the fluid outlet.

[16]

The production method for the honeycomb structure for supporting catalyst according to [15], wherein the fluid is in a smoke form.

[17]

A production method for a catalyst-supported honeycomb structure, the production method comprising bringing at least part of the partition walls of the honeycomb structure for supporting catalyst according to any one of [1] to [13] into contact with a catalyst composition slurry.

[18]

A production method for a catalyst-supported honeycomb structure, the production method comprising bringing at least the first region and the second region of the partition walls of the honeycomb structure for supporting catalyst according to any one of [1] to [13] into contact with a catalyst composition slurry.

[19]

A production method for a catalyst-supported honeycomb structure, the production method comprising carrying out: step 1 of bringing at least the first region and the second region of the partition walls of the honeycomb structure for supporting catalyst according to any one of [11] to [13] into contact with a first catalyst composition slurry; step 2 of removing at least part of hydrophobic substance adhering to the second region of the partition walls of the honeycomb structure for supporting catalyst after step 1; and step 3 of bringing the first region and the second region of the partition walls of the honeycomb structure for supporting catalyst into contact with a second catalyst composition slurry after step 2.

[20]

The production method for a catalyst-supported honeycomb structure according to [19], wherein step 2 is carried out together with heat treatment intended to bake a catalyst component contained in the first catalyst composition slurry onto the partition walls.

The honeycomb structure for supporting catalyst according to one embodiment of the invention makes it easy to carry out zone coating.

DETAILED DESCRIPTION OF THE PREFERRED EMBODIMENTS

Next, embodiments of the present invention will be described in detail with reference to the drawings. It should be understood that the present invention is not limited to the following embodiments and that design changes, improvements, or the like can be made as appropriate by those with ordinary skill in the art without departing from the spirit and scope of the present invention.

(1. Honeycomb Structure for Supporting Catalyst)

(1-1 Overall Structure)

Figure 1:
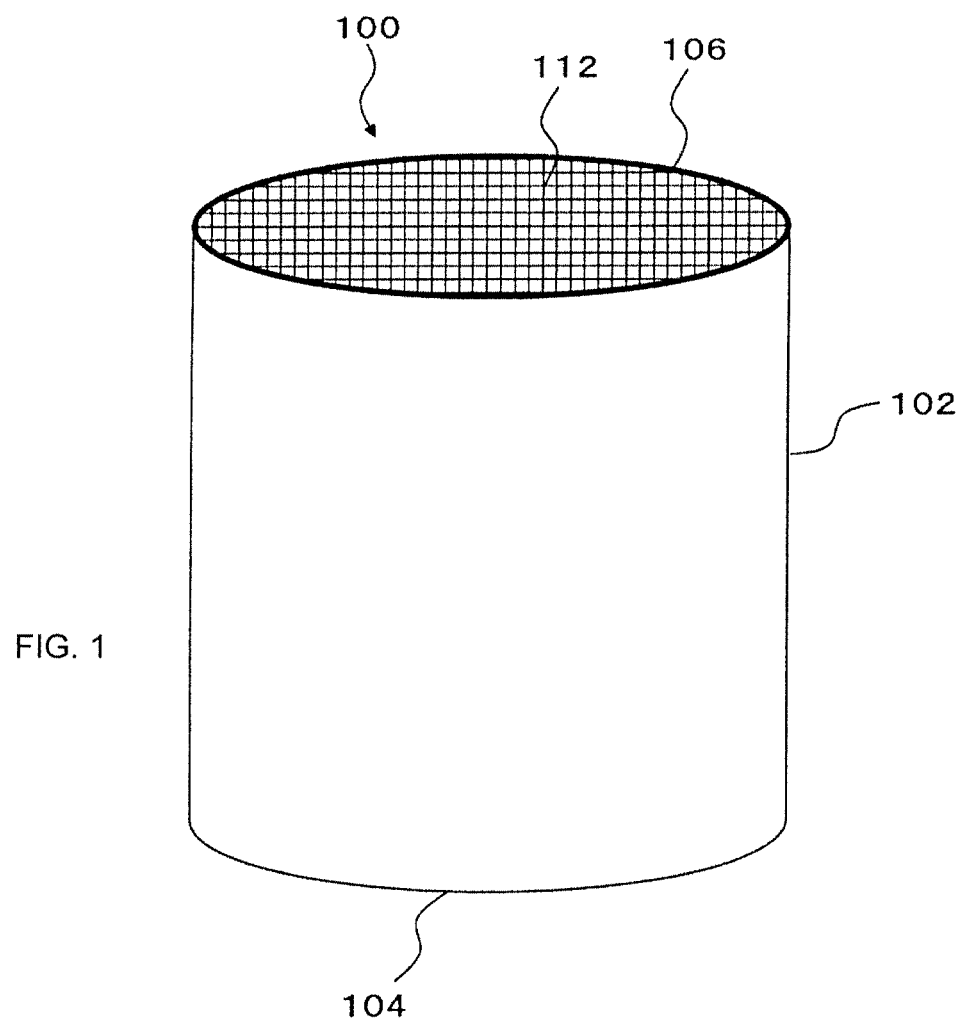
FIG. 1 is a schematic perspective view according to one embodiment of a honeycomb structure for supporting catalyst of the present invention.
Figure 2:
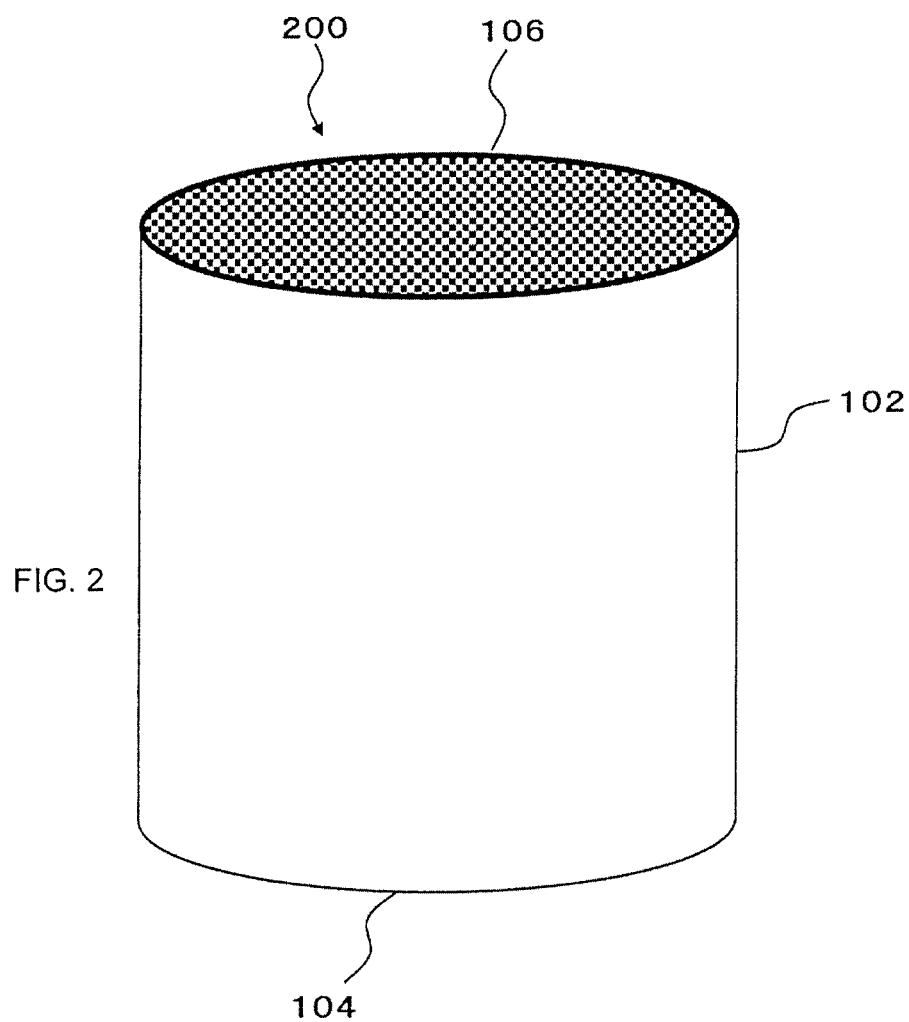
FIG. 2 is a schematic perspective view according to another embodiment of a honeycomb structure for supporting catalyst of the present invention.
Figure 3:
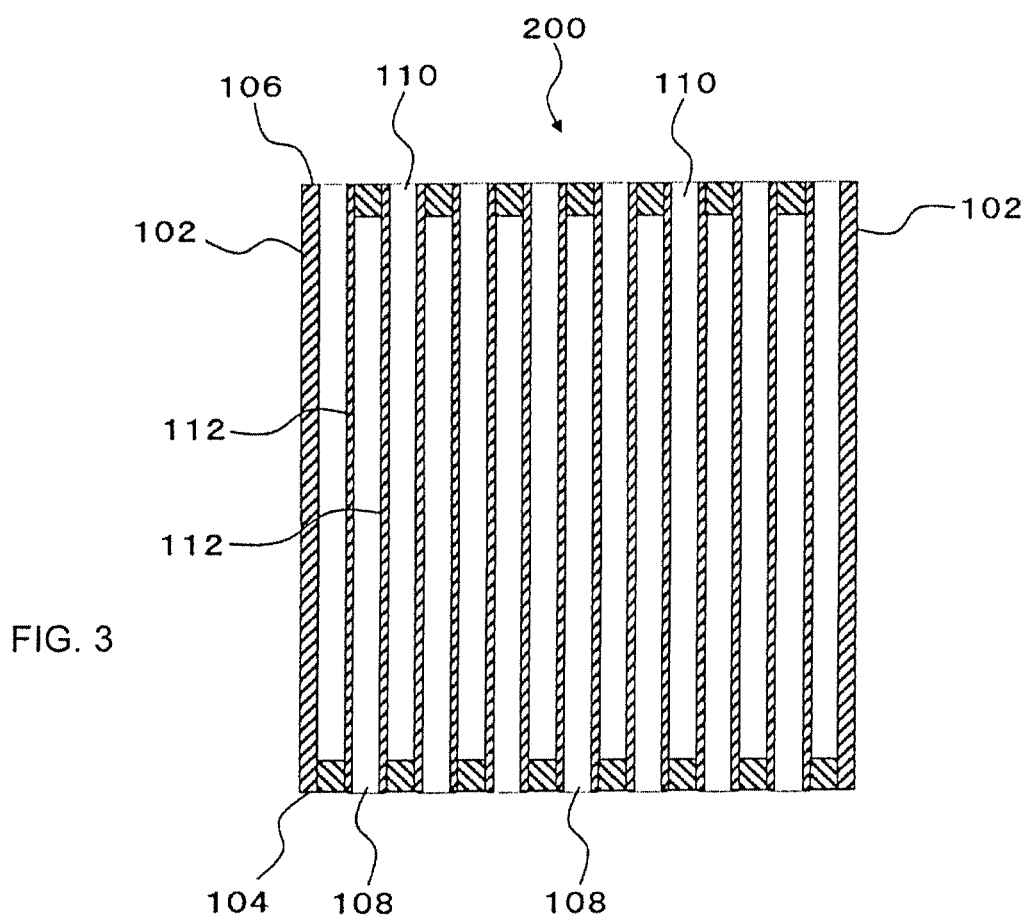
FIG. 3 is a schematic diagram of a cross section parallel to a height direction (cell extension direction) of the honeycomb structure for supporting catalyst of FIG. 2.

FIG. 1 shows a schematic perspective view according to one embodiment of a honeycomb structure for supporting catalyst of the present invention. FIG. 2 shows a schematic perspective view according to another embodiment of a honeycomb structure for supporting catalyst of the present invention. FIG. 3 shows a schematic diagram of a cross section parallel to a height direction (cell extension direction) of the honeycomb structure for supporting catalyst of FIG. 2.

The honeycomb structure for supporting catalyst 100 according to the embodiment of FIG. 1 is a pillar-shaped honeycomb structure for supporting catalyst that includes an outer peripheral side wall 102 and partition walls 112 configured to partition a plurality of cells disposed on an inner side of the outer peripheral side wall 102, extending from a first end face 104 provided with a fluid inlet to a second end face 106 provided with a fluid outlet. The honeycomb structure for supporting catalyst 100 according to the present embodiment is a flow-through type in which opposite ends of each cell are open to first end face 104 and second end face 106, and a fluid flowing in through an inlet of a cell can flow out directly through an outlet of the cell. Flow-through type honeycomb structures are widely used for the purpose of supporting catalysts including, but not limited to, oxidation catalysts, reduction catalysts, and three-way catalysts.

The honeycomb structure for supporting catalyst 200 according to the embodiment of FIGS. 2 and 3 is a pillar-shaped honeycomb structure for supporting catalyst that includes partition walls 112 configured to partition a plurality of cells extending from a first end face 104 provided with a fluid inlet to a second end face 106 provided with a fluid outlet as with the honeycomb structure for supporting catalyst according to the embodiment of FIG. 1. However, the honeycomb structure for supporting catalyst 200 according to the present embodiment differs from the embodiment of FIG. 1 in that the present embodiment is a wall-flow type in which cells with one end open and another end plugged are arranged alternately in a checkered pattern. Wall-flow type honeycomb structures, which can collect solid contents (PM) such as soot and SOF in exhaust gas, are suitably used as diesel particulate filters (DPFs) and gasoline particulate filters (GPFs) and often support SCR catalysts, oxidation catalysts, or three-way catalysts.

Specifically, the honeycomb structure for supporting catalyst 200 according to the embodiment of FIGS. 2 and 3 includes an outer peripheral side wall 102, and a plurality of first cells 108 disposed on an inner side of the outer peripheral side wall 102, extending from a first end face 104 to a second end face 106 with the first end face 104 open and the second end face 106 plugged, and a plurality of second cells 110 disposed on the inner side of the outer peripheral side wall 102, extending from the first end face 104 to the second end face 106 with the first end face 104 plugged and the second end face 106 open. Also, the honeycomb structure for supporting catalyst 200 includes porous partition walls 112 configured to partition the first cells 108 and second cells 110, with the first cells 108 and second cells 110 being placed adjacent to each other alternately via the partition walls 112.

When gas containing particulate matter is supplied to the first end faces 104 on an upstream side of the honeycomb structure for supporting catalyst 200, the gas is introduced into the first cells 108 and flows downstream through the first cells 108. Since the first cells 108 have the second end faces 106 on a downstream side plugged, the gas flows into the second cells 110 by passing through the porous partition walls 112 partitioning between the first cells 108 and second cells 110. The particulate matter, which cannot pass through the partition walls 112, is collected in the first cells 108 and deposits there. After the particulate matter is removed, clean gas flowing into the second cells 110 flows downstream through the second cells 110 and flows out through the second end faces 106 on the downstream side.

The outer shape of the honeycomb structure for supporting catalyst is not particularly limited as long as it is pillar-shaped, and may be, for example, a pillar shape with a circular end face (a cylindrical shape), a pillar shape with an oval end face, a pillar shape with a polygonal (quadrangular, pentagonal, hexagonal, heptagonal, octagonal, etc.) end face, or the like.

There is no particular limit to the size of the honeycomb structure for supporting catalyst. However, a large size allows an amount of supported catalyst to be increased, while on the other hand, too large a size results in reduced thermal shock resistance. Thus, preferably the end face area is 5000 to 200000 $mm^2$, more preferably 6500 to 125000 $mm^2$, and still more preferably 8000 to 75000 $mm^2$.

(1-2 Partition Wall)

The partition walls 112 can be made of ceramics. There is no particular limit to ceramic materials suitable for the partition walls, but possible ceramic materials include cordierite, mullite, zircon, aluminum titanate, silicon carbide, silicon-silicon carbide composite, silicon nitride, zirconia, spinel, indialite, sapphirine, corundum, titania, alumina, and silica-alumina.

The partition walls 112 can be porous. In this case, from the viewpoint of increasing heat-up characteristics and from the viewpoint of suppressing pressure losses in the case of a filter structure, porosity of the partition walls is preferably 15% or above, more preferably 20% or above, and still more preferably 22% or above. Also, from the viewpoint of ensuring strength of the honeycomb structure, the porosity of the partition walls is preferably 75% or below, more preferably 70% or below, and still more preferably 68% or below. The porosity is measured by a mercury penetration method in conformity to JIS R1655:2003 using a mercury porosimeter.

When the partition walls 112 are porous, from the viewpoint of increasing adhesion to the catalyst, mean pore size of the partition walls 112 is preferably 1 μm or above, more preferably 2 μm or above, and still more preferably 3 μm or above. Also, from the viewpoint of ensuring strength and from the viewpoint of increasing collection efficiency in the case of a filter structure, the mean pore size of the partition walls is preferably 40 μm or below, more preferably 35 μm or below, and still more preferably 30 μm or below. The mean pore size is a value measured by a mercury porosimeter.

There is no particular limit to the thickness of the partition walls 112. However, from the viewpoint of increasing the strength of the honeycomb structure, the thickness is preferably 0.05 mm or above, more preferably 0.12 mm or above, and still more preferably 0.15 mm or above. Also, from the viewpoint of suppressing pressure losses, the thickness of the partition walls is preferably 0.5 mm or below, more preferably 0.45 mm or below, and still more preferably 0.4 mm or below.

To make it easy to carry out catalyst zone coating in a post-process, desirably the partition walls 112 include a first region with a high initial water absorption speed and a second region with a lower initial water absorption speed than the first region. A large difference in the initial water absorption speed can increase a difference in an amount of adhering catalyst, enabling effective zone coating. Thus, the initial water absorption speed of the second region is preferably 15% or more lower, more preferably 20% or more lower, and still more preferably 30% or more lower than the initial water absorption speed of the first region. There is no particular upper limit to the lowering rate of the initial water absorption speed of the second region to the initial water absorption speed of the first region, but from the viewpoint of production cost, generally the rate is 90% or below, and typically 80% or below.

Figure 4:
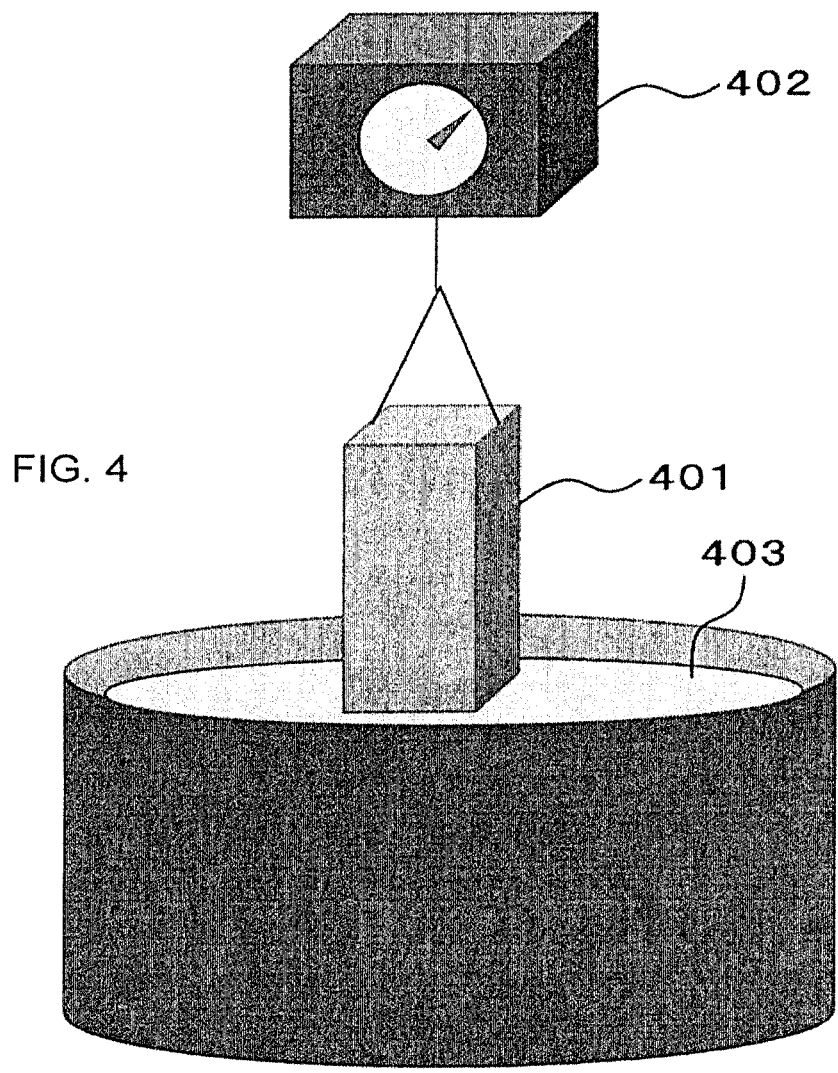
FIG. 4 is a schematic diagram for explaining a method for measuring the initial water absorption speed.

Procedures for measuring the initial water absorption speed will be described with reference to FIG. 4. A cuboidal test piece 401 measuring 10 mm by 10 mm by 50 mm with a dimension of 50 mm in the height direction (cell extension direction) of the honeycomb structure for supporting catalyst is taken from the honeycomb structure for supporting catalyst to be measured. Next, the test piece is hung from a hanging weight meter 402 such that a 50-mm longitudinal side will be oriented in a vertical direction as shown in FIG. 4, and is lowered at a speed of 10 mm/min until a lower end touches water 403. In so doing, an increase in the weight (absorbed water weight) of the test piece during a period of 0.5 seconds after the lower end touches water is found and designated as the initial water absorption speed [g/sec] of the test piece.

Figure 5:
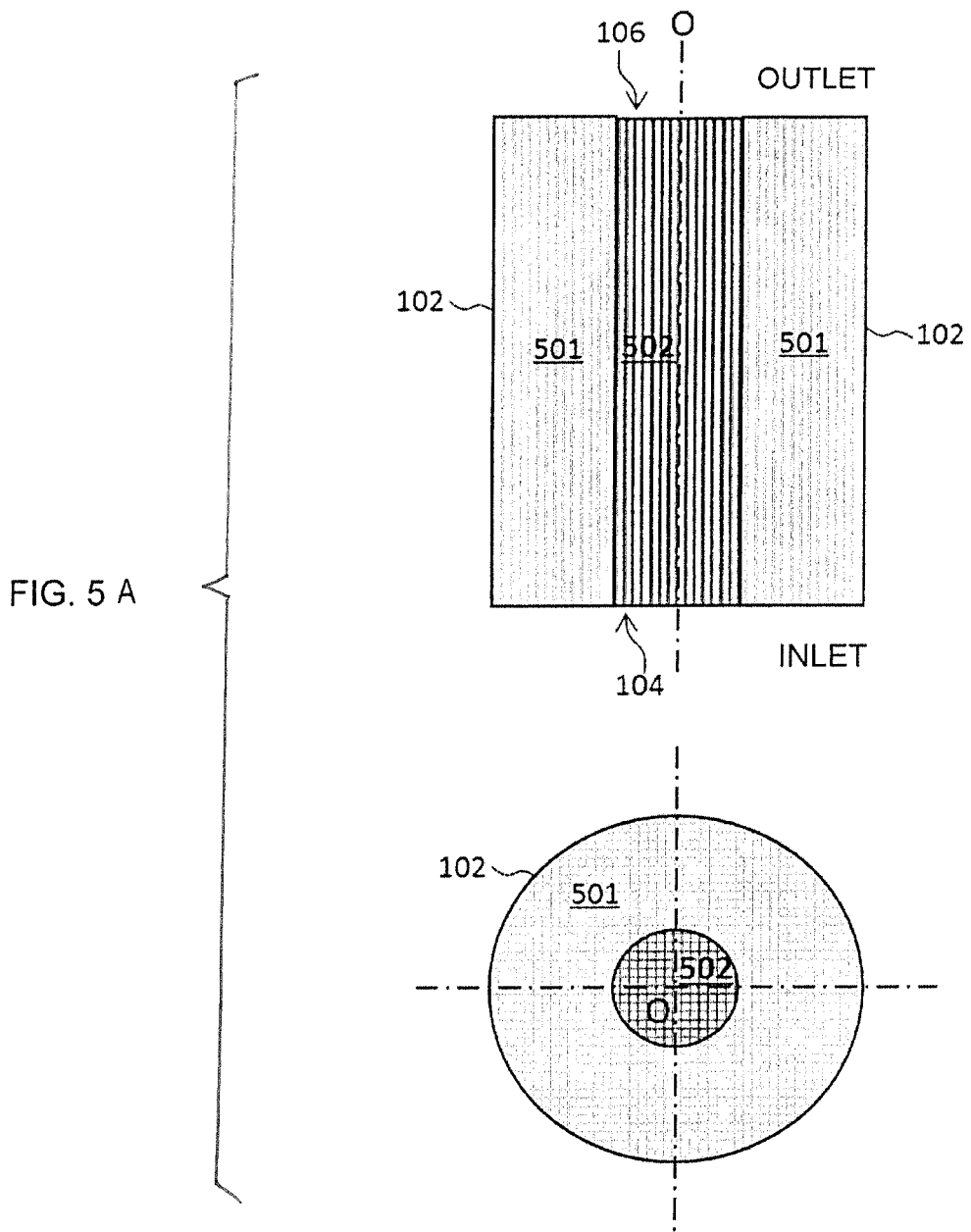
FIGS. 5A and 5B are conceptual sectional views when partition walls show a distribution of initial water absorption speed in a direction perpendicular to the height direction (cell extension direction) of the honeycomb structure.
Figure 5:
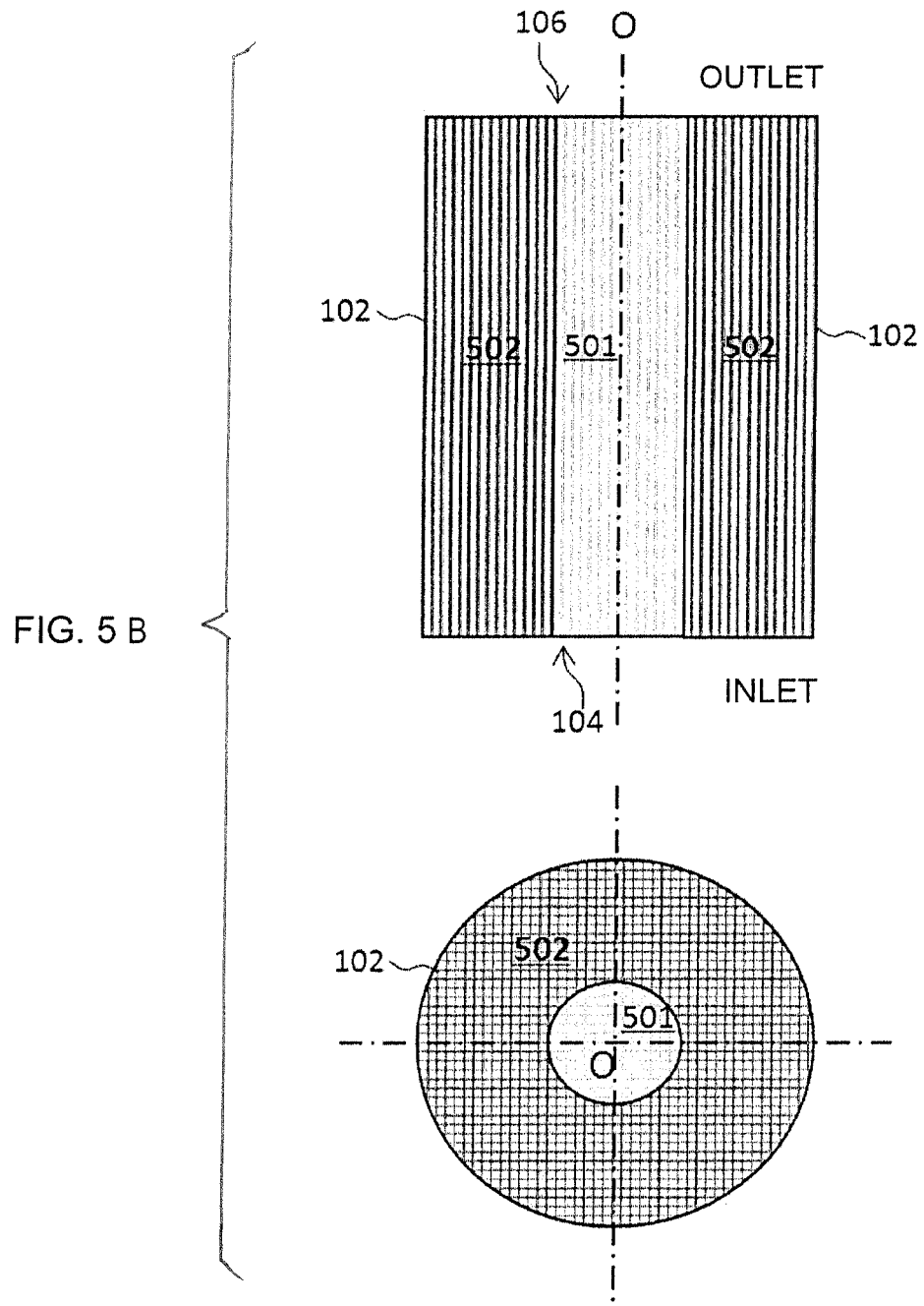
Figure 6:
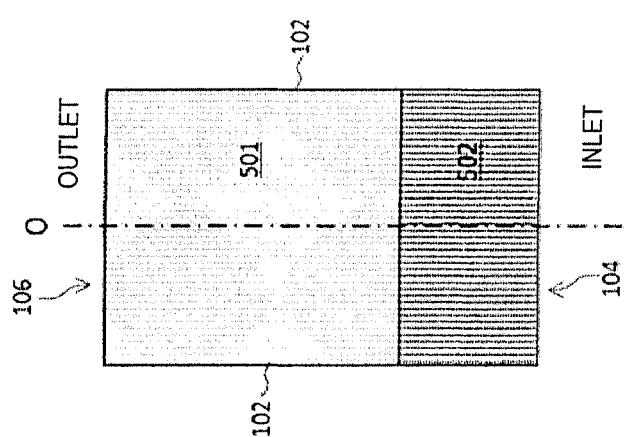
FIGS. 6A to 6C are conceptual sectional views when partition walls show a distribution of initial water absorption speed in a direction parallel to the height direction (cell extension direction) of the honeycomb structure.
Figure 6:
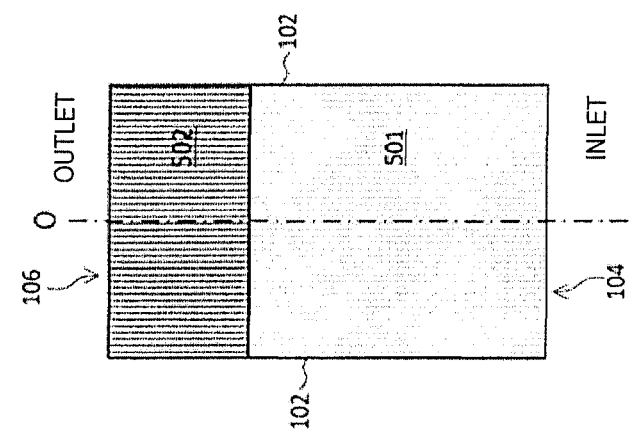
Figure 6:
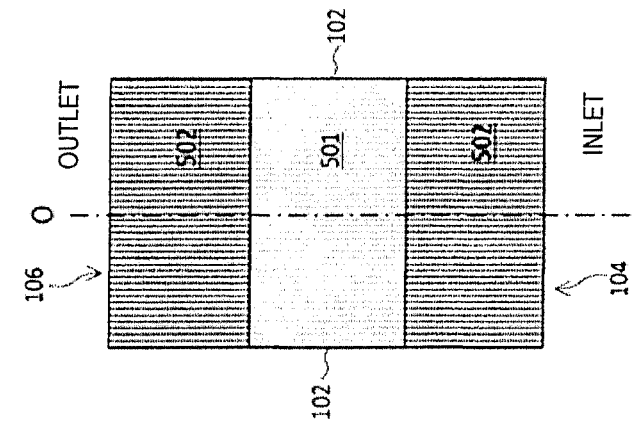

There is no particular limit to the arrangement of the first region and the second region, and the arrangement may be established as appropriate according to a desired coating pattern with different catalysts. Methods for arranging the first region and second region will be illustrated by example below in FIGS. 5 to 7. Note that although a boundary between the first region and second region is shown clearly in the illustrated embodiment, the boundary between the first region and second region may include a transition region in which the initial water absorption speed decreases from the first region toward the second region. Also, besides the transition region, there may be another partition wall region having an initial water absorption speed different from those of the first region and second region.

FIGS. 5A and 5B show a conceptual sectional view of the honeycomb structure seen in a direction perpendicular to a central axis (upper side) and a conceptual sectional view of the honeycomb structure seen in a direction of the central axis (lower side) when partition walls show a distribution of initial water absorption speed in a direction perpendicular to the height direction (cell extension direction) of the honeycomb structure. In the embodiment of FIG. 5A, the partition walls include a first region 501 located on an outer peripheral side and a second region 502 located on a side closer to the central axis O than the first region 501. In the embodiment of FIG. 5B, the partition walls include the second region 502 located on the outer peripheral side and the first region 501 located on the side closer to the central axis O than the second region 502.

FIGS. 6A to 6C show conceptual sectional views of the honeycomb structure seen in a direction perpendicular to a central axis when partition walls show a distribution of initial water absorption speed in a direction parallel to the height direction (cell extension direction) of the honeycomb structure. In the embodiment of FIG. 6A, the partition walls include the second region 502 located on the side of the fluid inlet and the first region located on a side closer to the fluid outlet than the second region. In the embodiment of FIG. 6B, the partition walls include the first region 501 located on the side of the fluid inlet and the second region 502 located on the side closer to the fluid outlet than the first region. In the embodiment of FIG. 6C, the partition walls include a part of the second region 502 located on the side of the fluid inlet, another part of the second region 502 located on the side of the fluid outlet, and the first region 501 located between the two parts of the second region 502.

Figure 7:
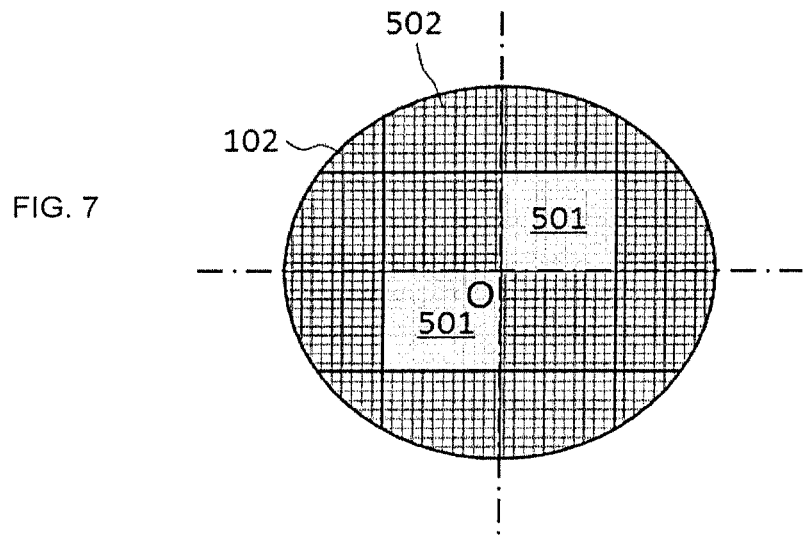
FIG. 7 is a conceptual sectional view of an integrated honeycomb body created by joining together outer peripheral side walls of multiple honeycomb structures differing in initial water absorption speed using a joining material.

Also, an integrated body provided with partition wall having the first region 501 and second region 502 as a whole may be constructed by joining together multiple honeycomb structures differing in initial water absorption speed. FIG. 7 illustrates by example a conceptual sectional view showing a distribution of water absorption speed in a cylindrical honeycomb structure as viewed in a direction of a central axis, where the cylindrical honeycomb structure is created by joining together outer peripheral side walls of multiple quadrangular prism-shaped honeycomb structures using a joining material and machining an outer periphery of the joined honeycomb structures.

There is no limit to the method for adjusting the initial water absorption speed of the partition walls. Examples of the method include a method for changing the material and porosity of the partition walls on a part by part basis and a method for causing hydrophobic substance to adhere to part of the partition walls based on the principle that partition walls with hydrophobic substance adhering thereto have a low initial water absorption speed. Of these methods, the method for causing hydrophobic substance to adhere to part of the partition walls is preferable from the viewpoint of production cost and simplicity. By causing hydrophobic substance to adhere selectively (the term "selectively" herein includes the concept of "preferentially") to part of the partition walls whose initial water absorption speed is desired to be reduced, it is possible to divide the partition walls into zones.

Thus, in one embodiment of the honeycomb structure for supporting catalyst according to the present invention, hydrophobic substance is adhering to the second region. There is no particular limit to the hydrophobic substance as long as the hydrophobic substance achieves the effect of reducing the initial water absorption speed of the partition walls. For example, the hydrophobic substance is one or more types selected from a group consisting of hydrophobic organosilicon compounds and hydrophobic organic compounds. Typically, the hydrophobic substance has low solubility in water and is capable of forming a separate phase from water. Preferably the hydrophobic substance has the value of an octanol/water partition coefficient Log P of 1 or above, more preferably 2 or above, and still more preferably 3 or above, and can be in a range of, for example, 1 to 20.

Also, in one embodiment of the honeycomb structure for supporting catalyst according to the present invention, a difference in the initial water absorption speed between the first region and second region is decreased by heat treatment at 600° C. or below. In this case, if catalyst coating is carried out before the heat treatment, the catalyst adheres in large quantities to the first region, but is less prone to adhere to the second region. However, subsequent heat treatment reduces the difference in the initial water absorption speed and the catalyst comes to readily adhere to the region that was the second region before heat treatment. Whereas the catalyst has already adhered to the first region, a large portion containing pores capable of supporting the catalyst remains in the second region of the partition walls. Thus, if catalyst coating is carried out again after the heat treatment, the catalyst can be selectively caused to adhere to the former second region.

When heat treatment is conducted at 600° C. or below, and preferably at 200° C. to 500° C., it is preferable the percentage of the initial water absorption speed of the region that was the second region before heat treatment to the initial water absorption speed of the region that was the first region before heat treatment become 90% or above, more preferably 95% or above, and still more preferably 97% or above.

The heat treatment at 600° C. or below means the process of heating the honeycomb structure for supporting catalyst, for example, at 500° C. and 1 atmospheric pressure in an air atmosphere for one hour.

Examples of the method for configuring the honeycomb structure for supporting catalyst such that the difference in the initial water absorption speed between the first region and second region will be decreased by heat treatment at 600° C. or below include a method using a substance that evaporates from the partition walls through heat treatment at 600° C. or below as the hydrophobic substance to be caused to adhere to the second region.

Examples of hydrophobic organosilicon compounds that can be used suitably include silane-based, siliconate-based, silicone-based, and silane composite-based water repellents.

Examples of hydrophobic organic compounds that can be used suitably include aliphatic compounds such as alcohol, ether, and ketone as well as aromatic compounds. Among these compounds, for the purpose of increasing hydrophobicity, aromatic compounds having high molecular weight such as 100 or above, and preferably 150 or above are used suitably.

(1-3 Cells)

There is no particular limit to the length of the honeycomb structure for supporting catalyst in the cell extension direction (height direction). However, a large length allows the amount of supported catalyst to be increased, while on the other hand, too large a length results in reduced thermal shock resistance. Thus, the length is preferably 50 to 400 mm, more preferably 60 to 350 mm, and still more preferably 70 to 310 mm.

There is no limit to the cell shape in a section orthogonal to the cell extension direction (height direction of the honeycomb structure), but the cell shape is preferably quadrangular, hexagonal, octagonal, or a combination thereof. Among these shapes, square and hexagonal shapes are preferable. Such a cell shape reduces pressure losses when gas flows through the honeycomb structure and provides excellent purification performance when the honeycomb structure is used as a filter.

There is no particular limit to the cell pitch of the honeycomb structure for supporting catalyst. However, from the viewpoint of reducing pressure losses, the cell pitch is preferably 0.6 mm or above, more preferably 0.7 mm or above, and still more preferably 0.8 mm or above. However, from the viewpoint of increasing the surface area of the partition walls and increasing the purification efficiency, the cell pitch is preferably 3.0 mm or below, more preferably 2.5 mm or below, and still more preferably 2.0 mm or below. Here, the cell pitch refers to the length of a line segment connecting the centers of gravity of two adjacent cells in a section perpendicular to the cell extension direction (height direction of the honeycomb structure).

(2. Production Method for Honeycomb Structure for Supporting Catalyst)

A preferred example of the production method for the honeycomb structure for supporting catalyst according to the present invention will be described below. In one embodiment, the production method for the honeycomb structure for supporting catalyst according to the present invention comprises bringing part of the partition walls of the pillar-shaped honeycomb structure for supporting catalyst into contact with hydrophobic substance, the honeycomb structure for supporting catalyst comprising the partition walls partitioning the plurality of cells extending from the first end face provided with the fluid inlet to the second end face provided with the fluid outlet.

(2-1 Producing a Honeycomb Structure)

First, a pillar-shaped honeycomb structure for supporting catalyst will be produced, where the honeycomb structure comprises the partition walls partitioning the plurality of cells extending from the first end face provided with the fluid inlet to the second end face provided with the fluid outlet. Such a pillar-shaped honeycomb structure for supporting catalyst itself can be produced using any known production process.

Thus, in one embodiment, the production method for the pillar-shaped honeycomb structure for supporting catalyst comprises a step of producing a pillar-shaped honeycomb formed body including an outer peripheral side wall, and the partition walls partitioning the plurality of cells disposed on an inner side of the outer peripheral side wall, extending from the first end face to the second end face.

The pillar-shaped honeycomb formed body can be produced by kneading a raw material composition containing a ceramic raw material, dispersion medium, pore-forming material, and binder, then forming the raw material composition into a green body, and then extrusion-molding the green body. Additives such as a dispersant can be mixed in the raw material composition as needed. A die that provides a desired overall shape, cell shape, partition wall thickness, cell density, and the like can be used for the extrusion molding.

The ceramic raw material remains after firing, and serves as a raw material for a part making up a frame of the honeycomb structure as ceramics. The ceramic raw material can be provided, for example, in the form of powder. Examples of the ceramic raw material include raw materials to obtain ceramics such as cordierite, mullite, zircon, aluminum titanate, silicon carbide, silicon-silicon carbide composites, silicon nitrides, zirconia, spinel, indialite, sapphirine, corundum, titania, etc. Concrete examples include, but not limited to, silica, talc, aluminum hydroxide, alumina, kaolin, serpentine, pyrophyllite, brucite, boehmite, mullite, and magnesite. One type of ceramic raw material may be used alone or two or more types may be used in combination. For filter applications such as DPF and GPF, cordierite, silicon carbide, and a silicon-silicon carbide composite can be used suitably as ceramics.

The pore-forming material is not particularly limited as long as pores are formed after firing, and may be, for example, wheat flour, starch, foaming resin, water-absorbing resin, silica gel, carbon (e.g., graphite), a ceramic balloon, polyethylene, polystyrene, polypropylene, nylon, polyester, acrylic, phenol, foamed foaming resin, or unfoamed foaming resin. One type of pore-forming material may be used alone or two or more types may be used in combination. From the viewpoint of increasing the porosity of the honeycomb structure, the content of the pore-forming material is preferably 0.5 parts by mass or above, more preferably 2 parts by mass or above, and still more preferably 3 parts by mass or above per 100 parts by mass of the ceramic raw material. From the viewpoint of ensuring the strength of the honeycomb structure, the content of the pore-forming material is preferably 10 parts by mass or below, more preferably 7 parts by mass or below, and still more preferably 4 parts by mass or below per 100 parts by mass of the ceramic raw material.

Examples of the binder include methyl cellulose, hydroxypropoxyl cellulose, hydroxyethyl cellulose, carboxymethyl cellulose, polyvinyl alcohol, and other organic binders. In particular, preferably methyl cellulose and hydroxypropoxyl cellulose are used together. Also, from the viewpoint of increasing the strength of the honeycomb formed body, preferably the content of the binder is 4 parts by mass or above per 100 parts by mass of the ceramic raw material, more preferably 5 parts by mass or above, and still more preferably 6 parts by mass or above. From the viewpoint of curbing crack formation caused by abnormal heat generation in a firing step, preferably the content of the binder is 9 parts by mass or below per 100 parts by mass of the ceramic raw material, more preferably 8 parts by mass or below, and still more preferably 7 parts by mass or below. One type of binder may be used alone or two or more types may be used in combination.

As the dispersant, a surfactant such as ethylene glycol, dextrin, fatty acid soap, or polyalcohol can be used. One type of dispersant may be used alone or two or more types may be used in combination. The content of the dispersant is preferably 0 to 2 parts by mass per 100 parts by mass of the ceramic raw material.

Examples of the dispersion medium include water and mixed solvents of water and an organic solvent such as alcohol, and in particular, water can be used suitably.

The content of water in the honeycomb formed body before a drying step is preferably 20 to 90 parts by mass, more preferably 60 to 85 parts by mass, and still more preferably 70 to 80 parts by mass per 100 parts by mass of the ceramic raw material. When the content of water in the honeycomb formed body is 20 parts by mass or above per 100 parts by mass of the ceramic raw material, the advantage of ease in stabilizing the quality of the honeycomb formed body is readily available. When the content of water in the honeycomb formed body is 90 parts by mass or below per 100 parts by mass of the ceramic raw material, shrinkage on drying is reduced and deformation can be inhibited. Herein, water content in the honeycomb formed body refers to a value measured by a weight loss on drying method.

In one embodiment of the honeycomb formed body, all the cells may be penetrated from the first end face to the second end face. According to another embodiment, the honeycomb formed body may include a plurality of first cells, of which a first end face is open and a second end face is plugged, and a plurality of second cells, of which a first end face is plugged and a second end face is open, the first cells and the second cells extending from the first end face to the second end face; and may have a cell structure in which the first cells and the second cells are placed adjacent to each other alternately via the partition walls. There is no particular limit to the method for plugging the end face of the honeycomb formed body, and a known technique can be adopted.

There is no particular limit to the material of the plugged portion, but ceramics are preferable from the viewpoint of strength and heat resistance. Preferably the ceramic material contains at least one type selected from a group consisting of cordierite, mullite, zircon, aluminum titanate, silicon carbide, silicon-silicon carbide composites, silicon nitrides, zirconia, spinel, indialite, sapphirine, corundum, and titania. Preferably the plugged portion is made of a material containing these ceramics at 50 mass % or above and more preferably 80 mass % or above in total. Still more preferably the plugged portion has a same material composition as a main body of the honeycomb formed body because an expansion coefficient during firing can be made equal and durability can be improved.

A pillar-shaped honeycomb structure for supporting catalyst can be produced by carrying out degreasing and firing after the pillar-shaped honeycomb formed body is dried. Regarding conditions for a drying step, degreasing step, and firing step, known conditions can be adopted according to the material composition of the honeycomb formed body, and there is no particular need for explanation, but concrete examples of conditions will be given below.

In the drying step, for example, any of conventionally known drying methods including hot-air drying, microwave drying, dielectric drying, reduced-pressure drying, vacuum drying, and freeze drying can be used. Among these methods, a drying method of combining hot-air drying with microwave drying or dielectric drying is preferable in that the entire formed body can be dried quickly and uniformly. In forming plugged portions, the plugged portions are formed on the opposite end faces of the dried honeycomb formed body and then the plugged portions are dried to obtain a dried honeycomb body.

A method for forming a plugged portion will be described illustratively. A plugging slurry is pre-stored in a storage container. Next, a mask having openings in a part corresponding to the cell on which a plugged portion is to be formed is affixed to one of the end faces. The end face with the mask affixed thereto is immersed in the storage container and then the plugged portion is formed by filling the plugging slurry into the openings. Another plugged portion can be formed on the other end face by a similar method.

Next, the degreasing step will be described. Combustion temperature of the binder is about 200° C. and combustion temperature of the pore-forming material is about 300 to 1000° C. Therefore, the degreasing step can be carried out by heating the honeycomb formed body in a range of about 200 to 1000° C. Heating time is not particularly limited, but is normally about 10 to 100 hours. After undergoing the degreasing step, the honeycomb formed body is referred to as a calcined body.

The firing step can be carried out, for example, by heating the calcined body to 1350 to 1600° C. and holding the temperature for 3 to 10 hours depending on the material composition of the honeycomb formed body.

(2-2 Contact with Hydrophobic Substance)

Next, part of the partition walls of the pillar-shaped honeycomb structure for supporting catalyst is brought into contact with hydrophobic substance. There is no particular limit to the method for contact with hydrophobic substance, but a method for contact with a fluid containing hydrophobic substance is simple and preferable. The fluid can be, for example, in a solution, slurry, or smoke form.

The part of the partition walls that has become hydrophobic with hydrophobic substance being attached thereto decreases in initial water absorption speed. Also, the degree of initial water absorption speed decrease can be controlled by adjusting the deposit, Log P value, and the like of the hydrophobic substance used. Therefore, by selectively bringing the hydrophobic substance into contact with part of the partition walls whose initial water absorption speed is desired to be reduced, a first region with a high initial water absorption speed and a second region with a low initial water absorption speed can be produced separately.

For example, possible methods for making the partition walls show a distribution of initial water absorption speed in a direction perpendicular to the height direction (cell extension direction) of the honeycomb structure for supporting catalyst include a method of causing a fluid containing hydrophobic substance to pass through a cell with one or both of the end faces of the honeycomb structure masked. Because the fluid flows into and through unmasked cells, if a portion to be masked is changed, locations of the first region and second region can be changed. If it is desired to form the first region on the outer peripheral side and form the second region on a side closer to a central axis than the first region, the outer peripheral side can be masked. The reverse is also true.

Also, possible methods for making the partition walls show a distribution of initial water absorption speed in a direction parallel to the height direction (cell extension direction) of the honeycomb structure for supporting catalyst includes a method of immersing part of the honeycomb structure in the height direction in a fluid containing hydrophobic substance (preferably a fluid in a slurry form). Also, when the honeycomb structure is a filter structure having a plugged portion, if smoke containing hydrophobic substance is caused to flow from an open side of cells, because the smoke gathers on an outlet side of the plugged cells, the hydrophobic substance can be selectively caused to adhere to the outlet side.

(3 Production Method for Catalyst-Supported Honeycomb Structure)

According to one aspect of the present invention, there is provided a production method for a catalyst-supported honeycomb structure, the production method comprising bringing at least part of the partition walls of the honeycomb structure for supporting catalyst according to the present invention into contact with a catalyst composition slurry.

The honeycomb structure for supporting catalyst according to the present invention varies from region to region in initial water absorption speed and varies in ease of catalyst adhesion accordingly. Consequently, a portion with a large catalyst deposit and a portion with a small catalyst deposit are formed automatically without the need to selectively apply the catalyst to a portion to which it is desired to make a large amount of catalyst adhere. Therefore, according to one embodiment of the production method for a catalyst-supported honeycomb structure, zone coating can be carried out by bringing a catalyst composition slurry into contact with at least the first region and the second region of the partition walls of the honeycomb structure for supporting catalyst. Also, according to another embodiment of the production method for a catalyst-supported honeycomb structure, zone coating can be carried out by bringing a catalyst composition slurry into contact with the entire honeycomb structure for supporting catalyst.

Also, one embodiment of the production method for a catalyst-supported honeycomb structure according to the present invention comprising carrying out: step 1 of bringing at least the first region and the second region of the partition walls of the honeycomb structure for supporting catalyst according to the present invention into contact with a first catalyst composition slurry; step 2 of removing at least part of hydrophobic substance adhering to the second region of the partition walls of the honeycomb structure for supporting catalyst after step 1; and step 3 of bringing the first region and the second region of the partition walls of the honeycomb structure for supporting catalyst into contact with a second catalyst composition slurry after step 2.

Step 1 allows the first catalyst composition slurry to adhere selectively to the first region of the partition walls. When the hydrophobic substance adhering to the second region is removed in step 2, because the initial water absorption speed of the second region is restored, the catalyst comes to readily adhere to the former second region. Whereas the first region is already supporting the first catalyst, making it difficult to support any more catalyst, a large portion containing pores capable of supporting the catalyst remains in the second region of the partition walls. Consequently, step 3, when carried out after the removal of hydrophobic substance, allows the second catalyst composition slurry to adhere selectively to the former second region.

Examples of the method for removing at least part of hydrophobic substance adhering to the second region of the partition walls include a method of conducting heat treatment at around a temperature at which at least part of the hydrophobic substance will evaporate or decompose. The heat treatment may be conducted separately from heat treatment conducted to bake a catalyst component contained in the first catalyst composition slurry onto the partition walls, but from the viewpoint of production efficiency, preferably these two heat treatments are combined. To this end, heat treatment temperature is preferably 400° C. or above, and more preferably 450° C. or above. However, the catalyst will deteriorate if the heat treatment temperature is too high. Thus, the heat treatment temperature is preferably 650° C. or below, and more preferably 600° C. or below.

Desirably the catalyst composition slurry contains an appropriate catalyst according to the application. Examples of catalysts include, but not limited to, oxidation catalysts, SCR catalysts, and three-way catalysts, which are used to remove pollutants such as soot, nitrogen oxides (NOx), soluble organic fraction (SOF), hydrocarbons (HC), and carbon monoxide (CO). The honeycomb structure for supporting catalyst according to the present invention makes it easy to implement zone coating that involves supporting different catalysts depending on the regions. The catalyst can contain appropriate ones of, for example, noble metals (Pt, Pd, Rh, etc.), alkali metals (Li, Na, K, Cs, etc.), alkaline earth metals (Ca, Ba, Sr, etc.), rare earth metals (Ce, Sm, Gd, Nd, Y, Zr, Ca, La, Pr, etc.), and transition metals (Mn, Fe, Co, Ni, Cu, Zn, Sc, Ti, V, Cr, etc.).

EXAMPLES

Examples will be illustrated below for better understanding of the present invention and its advantages, but the present invention is not limited to the examples.

(Preparation of Honeycomb Structure)

A sufficient number of wall-flow type honeycomb structures for the following tests were prepared from silicon carbide. The honeycomb structures had a cylindrical shape with 143.8 mm in diameter, 152.4 mm in height and a plugging depth of 6 mm. The partition walls of the honeycomb structure had a thickness of 0.3 mm, a porosity of 64%, and a mean pore size of 19 μm. The cells of the honeycomb structure were square in cross section and the cell pitch was 1.5 mm.

Example 1-1

Using the honeycomb structure prepared as described above, smoke was caused to flow through cells from the side of the first end face toward the second end face for 13 minutes. The smoke, which contained hydrophobic substance (aromatic hydrocarbon), was produced by burning incense.

Figure 8:
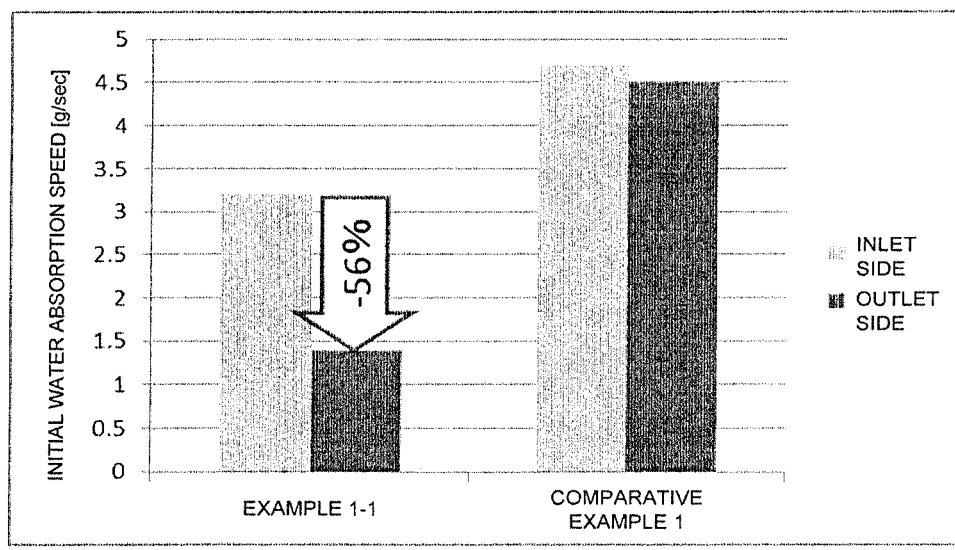
FIG. 8 is a graph showing changes in initial water absorption speed on an inlet side and outlet side in Example 1-1 and Comparative example 1.

Next, a test piece for use in measuring initial water absorption speed was taken from the vicinity of the central axis on the side of the first end face of the honeycomb structure with the hydrophobic substance adhering thereto and initial water absorption speed was measured following the measuring procedures described above. Also, a test piece for use in measuring initial water absorption speed was taken from the vicinity of the central axis on the side of the second end face of the honeycomb structure and initial water absorption speed was measured following the measuring procedures described above. Results are shown in Table 1 and FIG. 8.

Figure 9:
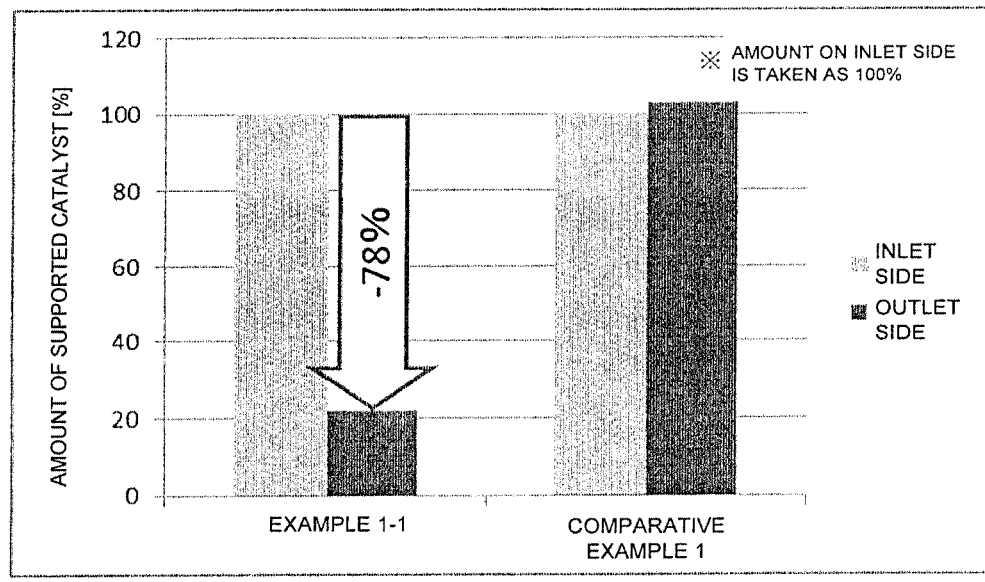
FIG. 9 is a graph showing changes in amounts of supported catalyst on the inlet side and outlet side in Example 1-1 and Comparative example 1.

A honeycomb structure with the hydrophobic substance adhering thereto was prepared separately using the same procedures as above. The entire honeycomb structure was immersed in a catalyst composition slurry containing an SCR catalyst for 10 seconds and was then pulled out. Then, the honeycomb structure coated with the catalyst composition slurry in this way was heated at 450° C. in an air atmosphere for 3 hours, thereby baking the catalyst onto the honeycomb structure. Using a method same as the sampling method used in measuring the initial water absorption speed, test pieces were taken, both on the side of the first end face (inlet side) and on the side of the second end face (outlet side), from the honeycomb structure with the catalyst baked thereon and the respective amounts of supported catalyst were measured by weight measurement. The ratio of the catalyst deposit on the outlet side to the catalyst deposit on the inlet side is shown in Table 1 and FIG. 9.

Comparative Example 1

Using the honeycomb structure prepared as described above, initial water absorption speed was measured on the side of the first end face and on the side of the second end face by following the same procedures as Example 1-1. Results are shown in Table 1 and FIG. 8.

Also, the catalyst composition slurry was applied to, and the catalyst was baked on, the honeycomb structure prepared as described above, using the same procedures as Example 1-1. Using the same method as Example 1-1, test pieces were taken, both on the side of the first end face and on the side of the second end face, from the honeycomb structure with the catalyst baked thereon. Then, the amounts of supported catalyst were measured using the same method as Example 1-1. The ratio of the catalyst deposit on the outlet side to the catalyst deposit on the inlet side is shown in Table 1 and FIG. 9.

TABLE 1

|  | Initial water absorption speed [g/sec] | | Amount of supported catalyst [%] | |
| --- | --- | --- | --- | --- |
|  | Inlet side | Outlet side | Inlet side | Outlet side |
| Example 1-1 | 3.2 | 1.4 | 100 | 22 |
| Comparative example 1 | 4.7 | 4.5 | 100 | 103 |

Comparative Example 2, Example 1-2, Example 1-3

Using the same procedures as Example 1-1 except that the duration for which smoke was allowed to flow was changed to the values shown in Table 2 according to test numbers, smoke was allowed to flow through the cells in the honeycomb structures prepared as described above, causing the hydrophobic substance to adhere. Using the honeycomb structure of each of the examples and comparative example, with the hydrophobic substance adhering to the honeycomb structures, initial water absorption speed was measured on the side of the first end face and on the side of the second end face by following the same procedures as Example 1-1. Regarding each of the examples and comparative example, the percentage ratio of the initial water absorption speed on the outlet side to the initial water absorption speed on the inlet side is shown in Table 2.

Figure 10:
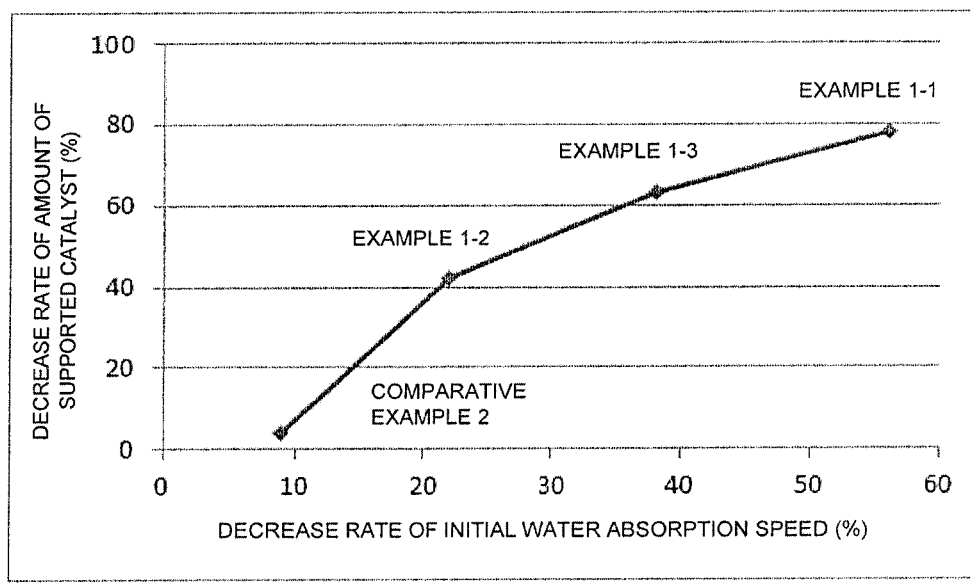
FIG. 10 is a graph showing a relationship between a decrease rate of initial water absorption speed and a decrease rate of an amount of supported catalyst based on results of Examples 1-1 to 1-3 and Comparative Example 2.

Also, honeycomb structures of the respective examples/comparative example were prepared separately with the hydrophobic substance caused to adhere thereto using the same procedures as above. The catalyst composition slurry was applied to, and the catalyst was baked on, the honeycomb structures using the same procedures as Example 1-1. Using the same method as Example 1-1, test pieces were taken, both on the side of the first end face and on the side of the second end face, from the honeycomb structure with the catalyst baked thereon. Then, the amounts of supported catalyst were measured using the same method as Example 1-1. Regarding each of the examples and comparative example, the percentage ratio of the catalyst deposit on the outlet side to the catalyst deposit on the inlet side is shown in Table 2 and FIG. 10.

TABLE 2

|  | Comparative example 2 | Example 1-2 | Example 1-3 | Example 1-1 |
| --- | --- | --- | --- | --- |
| Decrease rate of initial water absorption speed (%) | 9 | 22 | 38 | 56 |
| Decrease rate of amount of supported catalyst (%) | 4 | 42 | 63 | 78 |
| Smoke flow time (min) | 2 | 4 | 7 | 13 |

Example 2

Ethyl benzene was prepared as hydrophobic substance. In a container containing ethyl benzene, the honeycomb structure prepared as described above was immersed to a depth of 30 mm in the cell extension direction (height direction) from the side of the first end face for 3 seconds. The honeycomb structure pulled out of the ethyl benzene was dried at normal temperature in an air atmosphere for 15 minutes. Subsequently, test pieces for use in measuring initial water absorption speed were taken from that portion of the honeycomb structure which was immersed in ethyl benzene and that portion of the honeycomb structure which was not immersed in ethyl benzene, respectively, and initial water absorption speed was measured following the measuring procedures described above. Results are shown in Table 3.

A honeycomb structure was prepared separately with the hydrophobic substance selectively caused to adhere thereto using the same procedures as above. The catalyst composition slurry was applied to, and the catalyst was baked on, the honeycomb structure using the same procedures as Example 1-1. Subsequently, test pieces were taken from that portion of the honeycomb structure which was immersed in ethyl benzene and that portion of the honeycomb structure which was not immersed in ethyl benzene, respectively, and the respective amounts of supported catalyst were measured following the measuring procedures described above. The ratio of the amount of supported catalyst of the portion immersed in ethyl benzene to the amount of supported catalyst of the portion not immersed in ethyl benzene is shown in Table 3.

TABLE 3

| Initial water absorption speed [g/sec] | | Amount of supported catalyst [%] | |
|---|---|---|---|
| Non-immersed portion | Immersed portion | Non-immersed portion | Immersed portion |
| 4.6 | 0.9 | 100 | 11 |

Example 3

<Coating with First Catalyst>

Cells in central regions of both end faces of the honeycomb structure prepared as described above were masked by concentrically affixing circular adhesive films 80 mm in diameter to each of the end faces. The same solution containing the hydrophobic substance as Example 2 was prepared and the honeycomb structure with the adhesive films affixed thereto was immersed completely in the solution for 3 seconds. The honeycomb structure was pulled out of the solution, and after film removal, dried at normal temperature in an air atmosphere for 15 minutes. Subsequently, test pieces for use in measuring initial water absorption speed were taken from an outer peripheral-side portion and central-axis-side portion of the honeycomb structure and initial water absorption speed was measured following the measuring procedures described above, where the central-axis-side portion corresponded to the cell portion that had been masked and the outer peripheral-side portion corresponded to the cell portion that had not been masked. Results are shown in Table 4-1.

A honeycomb structure was prepared separately by being masked and selectively subjected to adhesion of the hydrophobic substance using the same procedures as above. The first catalyst composition slurry was applied to, and the catalyst was baked on, the honeycomb structure using the same procedures as Example 1-1. Test pieces were taken from an outer peripheral-side portion and central-axis-side portion of the honeycomb structure and the respective amounts of supported catalyst were measured following the measuring procedures described above, where the central-axis-side portion corresponded to the cell portion that had been masked and the outer peripheral-side portion corresponded to the cell portion that had not been masked. The ratio of the amount of supported catalyst of the outer peripheral-side portion (unmasked portion) to the amount of supported catalyst of the central-axis-side portion (masked portion) is shown in Table 4-1.

TABLE 4-1

| Coating with first catalyst | | | |
|---|---|---|---|
| Initial water absorption speed [g/sec] | | Amount of supported catalyst [%] | |
| Masked portion | Unmasked portion | Masked portion | Unmasked portion |
| 4.7 | 1.0 | 100 | 12 |

<Coating with Second Catalyst>

A honeycomb structure was prepared separately by being subjected to the steps up to baking of the catalyst using the same procedures as above. To check whether the hydrophobic substance had vanished along with baking of the catalyst, test pieces for use in measuring initial water absorption speed were taken from an outer peripheral-side portion and central-axis-side portion of the honeycomb structure with the catalyst baked thereon and initial water absorption speed was measured following the measuring procedures described above, where the central-axis-side portion corresponded to the cell portion that had been masked and the outer peripheral-side portion corresponded to the cell portion that had not been masked. Results are shown in Table 4-2.

A honeycomb structure was prepared separately by being subjected to the steps up to baking of the first catalyst using the same procedures as above. The entire honeycomb structure was immersed in a second catalyst composition slurry containing a high concentration of the SCR catalyst for 10 seconds and was then pulled out. Then, the honeycomb structure coated with the catalyst composition slurry in this way was heated at 450° C. in an air atmosphere for 3 hours, thereby baking the catalyst onto the honeycomb structure. Test pieces were taken from a masked central-axis-side portion and unmasked outer peripheral-side portion of the resulting honeycomb structure, respectively, and the amount of catalyst supported on the central-axis-side portion and the amount of catalyst supported on the outer peripheral-side portion were measured by weight measurement. Results are shown in Table 4-2.

TABLE 4-2

| Coating with second catalyst | | | |
|---|---|---|---|
| Initial water absorption speed after baking of first catalyst [g/sec] | | Amount of supported catalyst [%] | |
| Masked portion | Unmasked portion | Masked portion | Unmasked portion |
| 4.7 | 4.8 | 100 | 86 |

REFERENCE SIGNS LIST

100, 200 Honeycomb structure for supporting catalyst
102 Outer peripheral side wall
104 First end face
106 Second end face
108 First cell
110 Second cell
112 Partition wall
501 First region
502 Second region

What is claimed is:

1. A pillar-shaped honeycomb structure for supporting catalyst, comprising partition walls partitioning a plurality of cells extending from a first end face provided with a fluid inlet to a second end face provided with a fluid outlet, wherein the partition walls include a first region with a high initial water absorption speed and a second region with a lower initial water absorption speed than the first region, and the initial water absorption speed of the second region is lower than the initial water absorption speed of the first region by 15% or more.

2. The honeycomb structure for supporting catalyst according to claim 1, wherein the partition walls show a distribution of initial water absorption speed in a direction perpendicular to an extension direction of the cells of the honeycomb structure, and has the first region located on an outer peripheral side and the second region located on a side closer to a central axis than the first region.

3. The honeycomb structure for supporting catalyst according to claim 1, wherein the partition walls show a distribution of initial water absorption speed in a direction perpendicular to an extension direction of the cells of the honeycomb structure, and has the second region located on an outer peripheral side and the first region located on a side closer to a central axis than the second region.

4. The honeycomb structure for supporting catalyst according to claim 1, wherein the partition walls show a distribution of initial water absorption speed in a direction parallel to an extension direction of the cells of the honeycomb structure, and has the second region located on a side of the fluid inlet and the first region located on a side closer to the fluid outlet than the second region.

5. The honeycomb structure for supporting catalyst according to claim 1, wherein the partition walls show a distribution of initial water absorption speed in a direction parallel to an extension direction of the cells of the honeycomb structure, and has the first region located on a side of the fluid inlet and the second region located on a side closer to the fluid outlet than the first region.

6. The honeycomb structure for supporting catalyst according to claim 1, wherein the partition walls show a distribution of initial water absorption speed in a direction parallel to an extension direction of the cells of the honeycomb structure, and has a part of the second region located on a side of the fluid inlet, another part of the second region located on a side of the fluid outlet, and the first region located between the two parts of the second region.

7. The honeycomb structure for supporting catalyst according to claim 1, wherein the initial water absorption speed of the second region is lower than the initial water absorption speed of the first region by 30% or more.

8. The honeycomb structure for supporting catalyst according to claim 1, wherein a difference in the initial water absorption speed between the first region and the second region is decreased by heat treatment at 600° C. or below.

9. The honeycomb structure for supporting catalyst according to claim 1, wherein a base material of the partition walls is ceramics.

10. The honeycomb structure for supporting catalyst according to claim 1, wherein the plurality of cells includes a plurality of first cells, of which a first end face is open and a second end face is plugged, and a plurality of second cells, of which a first end face is plugged and a second end face is open; and the first cells and the second cells are placed adjacent to each other alternately via the partition walls.

11. The honeycomb structure for supporting catalyst according to claim 1, wherein hydrophobic substance is adhering to the second region.

12. The honeycomb structure for supporting catalyst according to claim 11, wherein the hydrophobic substance includes one or more types selected from a group consisting of hydrophobic organosilicon compounds and hydrophobic organic compounds.

13. The honeycomb structure for supporting catalyst according to claim 11, wherein at least part of the hydrophobic substance adhering to the second region evaporates at 600° C. or below.

14. A production method for the honeycomb structure for supporting catalyst according to claim 1, the production method comprising bringing part of the partition walls of the pillar-shaped honeycomb structure for supporting catalyst into contact with hydrophobic substance, the honeycomb structure for supporting catalyst comprising the partition walls partitioning the plurality of cells extending from the first end face provided with the fluid inlet to the second end face provided with the fluid outlet.

15. The production method for the honeycomb structure for supporting catalyst according to claim 14, the production method comprising bringing part of the partition walls of the pillar-shaped honeycomb structure for supporting catalyst into contact with a fluid containing hydrophobic substance, the honeycomb structure for supporting catalyst comprising the partition walls partitioning the plurality of cells extending from the first end face provided with the fluid inlet to the second end face provided with the fluid outlet.

16. The production method for the honeycomb structure for supporting catalyst according to claim 15, wherein the fluid is in a smoke form.

17. A production method for a catalyst-supported honeycomb structure, the production method comprising bringing at least part of the partition walls of the honeycomb structure for supporting catalyst according to claim 1 into contact with a catalyst composition slurry.

18. A production method for a catalyst-supported honeycomb structure, the production method comprising bringing at least the first region and the second region of the partition walls of the honeycomb structure for supporting catalyst according to claim 1 into contact with a catalyst composition slurry.

19. A production method for a catalyst-supported honeycomb structure, the production method comprising carrying out:
   step 1 of bringing at least the first region and the second region of the partition walls of the honeycomb structure for supporting catalyst according to claim 1 into contact with a first catalyst composition slurry;
   step 2 of removing at least part of hydrophobic substance adhering to the second region of the partition walls of the honeycomb structure for supporting catalyst after step 1; and
   step 3 of bringing the first region and the second region of the partition walls of the honeycomb structure for supporting catalyst into contact with a second catalyst composition slurry after step 2.

20. The production method for a catalyst-supported honeycomb structure according to claim 19, wherein step 2 is carried out together with heat treatment intended to bake a catalyst component contained in the first catalyst composition slurry onto the partition walls.

* * * * *